United States Patent [19]
Windsor

[11] 3,896,862
[45] July 29, 1975

[54] TREE HARVESTING APPARATUS
[75] Inventor: Robert N. Windsor, Brisbane, Australia
[73] Assignee: Eaton Yale Ltd., Canada
[22] Filed: Mar. 7, 1974
[21] Appl. No.: 449,045

[52] U.S. Cl. .............. 144/3 D; 144/2 Z; 144/34 E; 144/309 AC
[51] Int. Cl. ............................................. B27c 9/00
[58] Field of Search ........ 144/2 Z, 3 D, 34 R, 34 E, 144/309 AC

[56] References Cited
UNITED STATES PATENTS

| 3,576,201 | 4/1971 | Smith | 144/34 E X |
|---|---|---|---|
| 3,618,647 | 11/1971 | Stuart | 144/3 D X |
| 3,623,521 | 11/1971 | Shields | 144/3 D |
| 3,643,711 | 2/1972 | Puna | 144/3 D X |
| 3,643,712 | 2/1972 | Doel et al. | 144/34 E |
| 3,721,280 | 3/1973 | French et al. | 144/2 Z |
| 3,818,957 | 6/1974 | Schoonover | 144/34 R |

Primary Examiner—Andrew R. Juhasz
Assistant Examiner—W. D. Bray
Attorney, Agent, or Firm—Teagno & Toddy

[57] ABSTRACT

An improved tree harvesting apparatus includes a felling assembly which is effective to grip and sever the trunk of a standing tree. The felling assembly then positions the tree in a delimber assembly which delimbs and tops the trunk of the tree. The delimbed tree trunk is deposited in a bunk or carrier. The felling assembly includes a felling head which is disposed on an articulated felling boom. The felling boom is pivotally mounted on a frame of a vehicle and includes a plurality of pivotally interconnected boom sections. All of the boom sections can be pivoted about a generally horizontal axis to tilt the felling head. An intermediate boom section is pivotal about a vertical axis to move the felling head sideways. An outer boom section is pivotal about a horizontal axis to raise and lower the felling head. If necessary, the outer boom section can be utilized to shove against the butt end of a delimbed tree trunk to position the tree trunk in the bunk.

15 Claims, 7 Drawing Figures

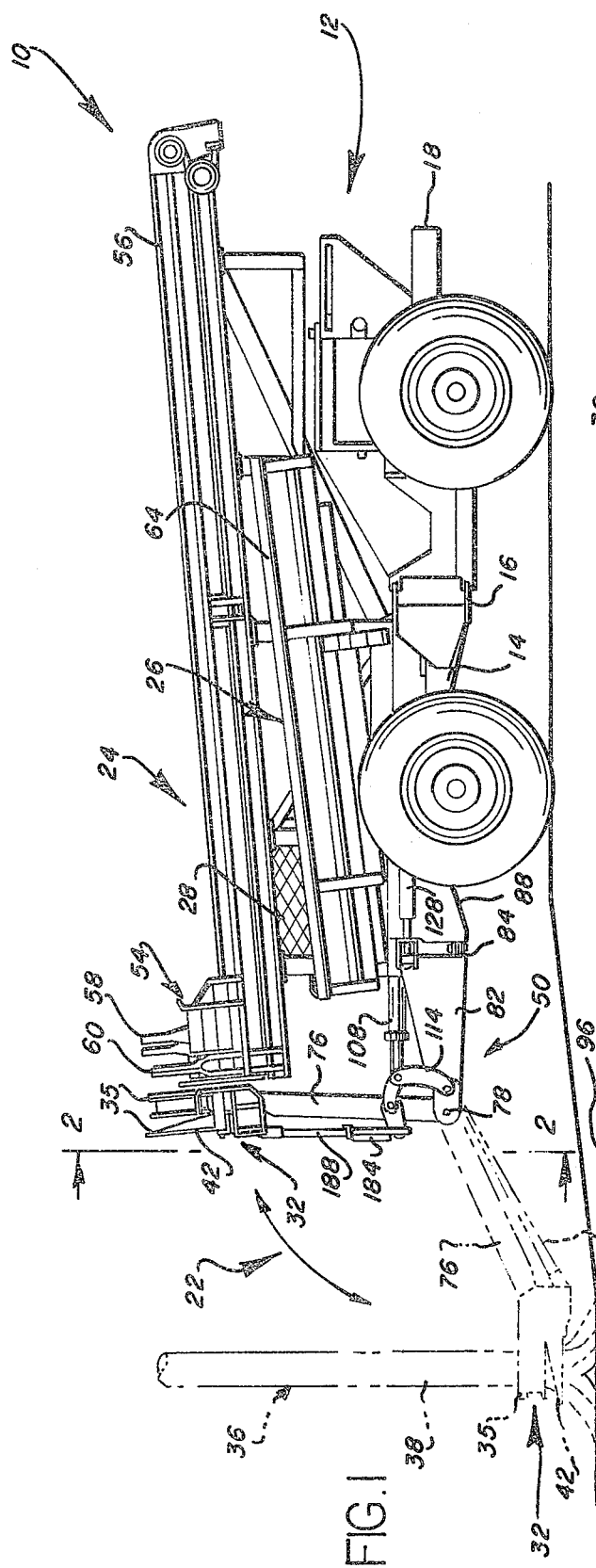
FIG. 1
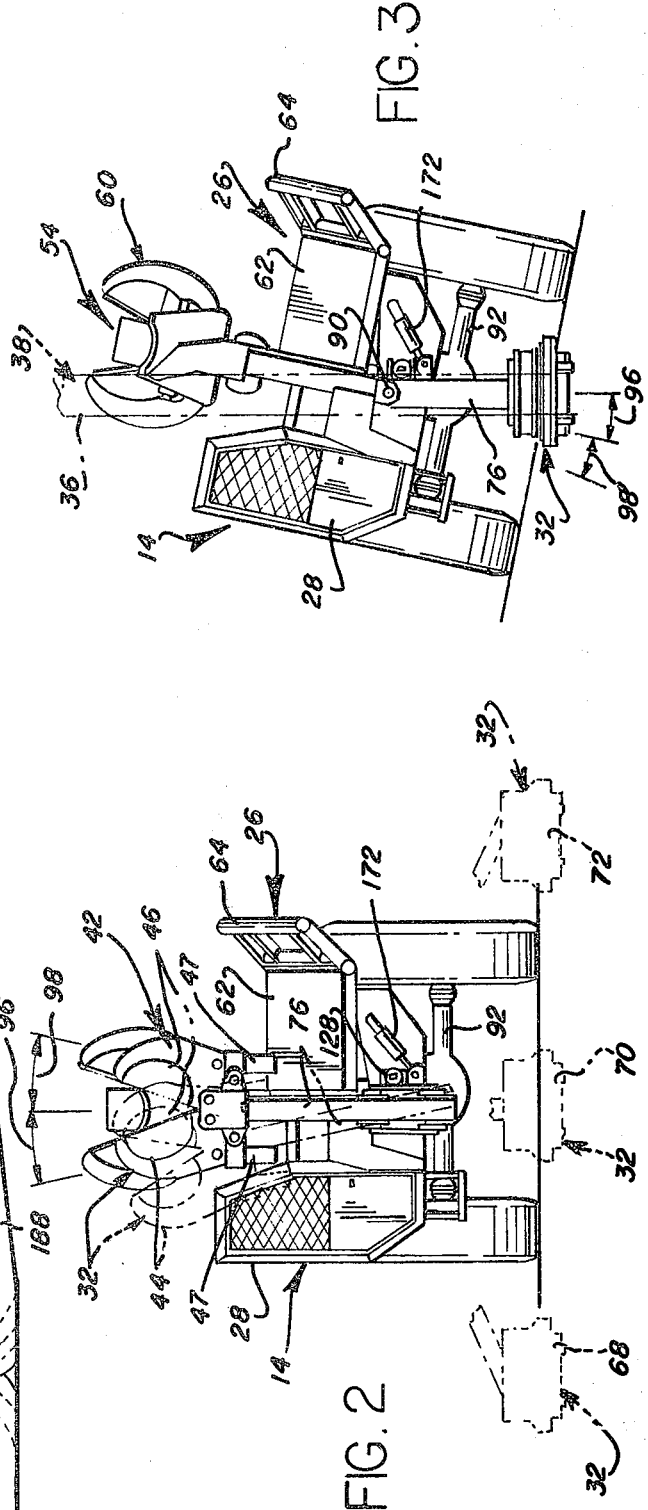
FIG. 2
FIG. 3

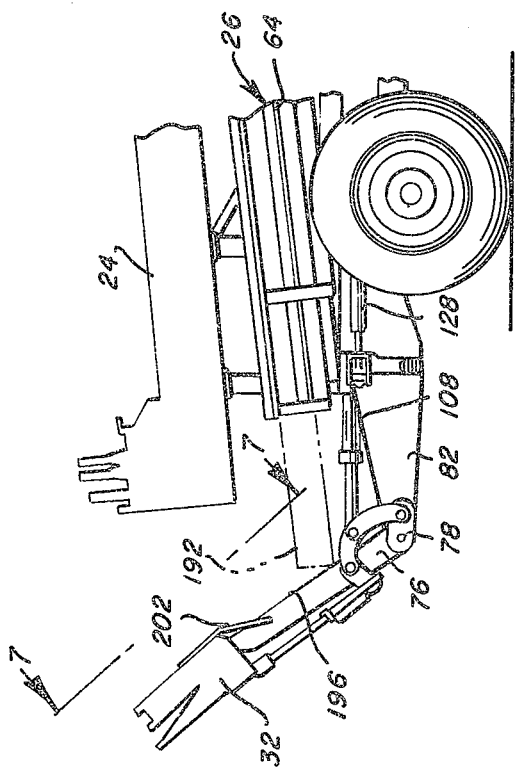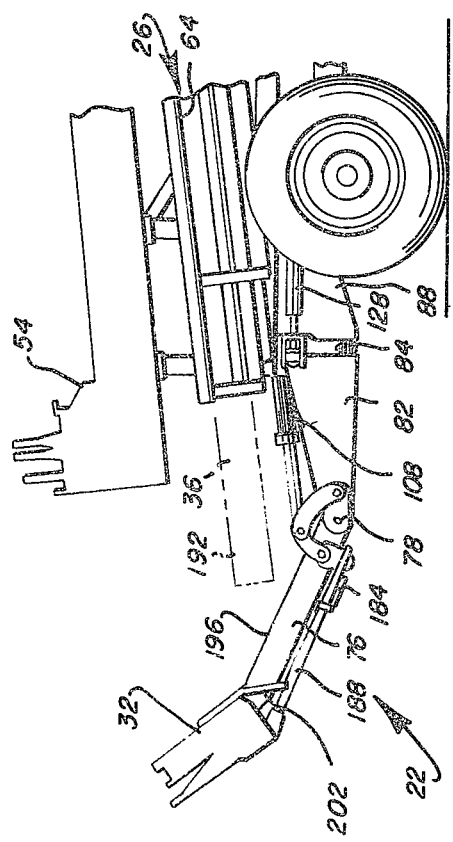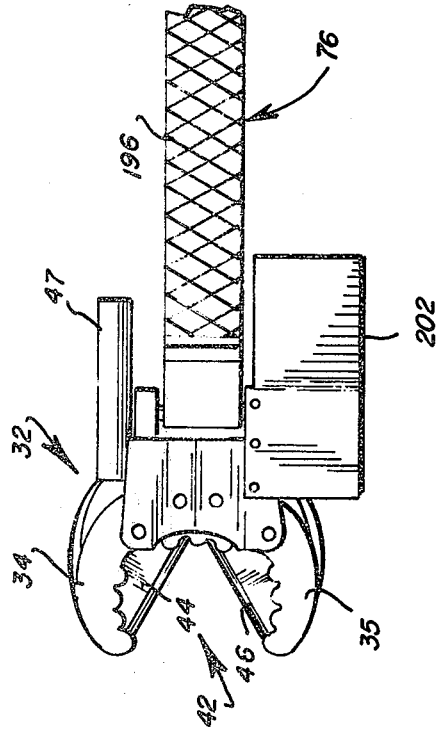

3,896,862

TREE HARVESTING APPARATUS

BACKGROUND OF THE INVENTION

The present invention relates to a new and improved apparatus for harvesting trees and more specifically to a tree harvesting apparatus which includes a felling head mounted on the outer end portion of an articulated felling boom.

Tree harvesting vehicles often include a felling head which is operable to clamp and sever a tree trunk. The clamped and severed tree trunk is then moved to a delimbing assembly which removes the branches and cuts off the top of the tree trunk. The delimbed and topped tree trunk is then deposited in a skidder or bunk.

Although these known tree harvesting mechanisms have been more or less satisfactory in their operation, they have been relatively expensive to fabricate. In addition, difficulty has been encountered in training operators to efficiently utilize these known tree harvesting mechanisms. Although certain tree harvesting mechanisms are less expensive and more easily operated than other tree harvesting mechanisms, these mechanisms have sacrificed operating functions and versatility in an effort to lower cost and simplify operating techniques.

SUMMARY OF THE PRESENT INVENTION

A tree harvesting apparatus constructed in accordance with the present invention is economical to manufacture and is relatively easy to operate. This tree harvesting apparatus includes an articulated boom having an outer section which is pivotal about any one of three axes to position a felling head relative to the trunk of a standing tree. The boom can move the felling head to position a severed tree in a delimber assembly. If a delimbed tree trunk should start to slide out of a bunk or carrier, the boom assembly can press against the butt end of the tree trunk to shove it back into the bunk.

The articulated felling boom assembly advantageously includes an inner boom section which is pivotally connected with the frame of a vehicle. This inner boom section can be pivoted or tilted relative to the frame of the vehicle to pivot the entire boom assembly about a horizontal axis disposed in a common plane with a longitudinal axis of a delimbing boom mounted on the vehicle. An intermediate section of the felling boom is mounted for pivotal movement about a vertical axis to enable the felling head to be moved from side to side. Finally, an outer section of the felling boom is pivotal about a horizontal axis to raise and lower the felling head.

Accordingly, it is an object of this invention to provide a new and improved tree harvesting apparatus which is economically constructed, versatile and reliable in operation, and which can be operated with a minimum of training.

Another object of this invention is to provide a new and improved tree harvesting apparatus having a felling head which is connected with an outer section of a felling boom and wherein the outer boom section is movable relative to a base about any one of three axes to facilitate positioning of the felling head relative to a tree trunk.

Another object of this invention is to provide a tree harvesting apparatus having an articulated boom which is pivotal about an axis disposed in a vertical plane which extends parallel to a longitudinal axis of a delimbing boom.

Another object of this invention is to provide a new and improved tree harvesting apparatus having a felling boom which can be utilized to shove the trunk of a tree back into a bunk if the tree trunk should start to slip out of the bunk.

BRIEF DESCRIPTION OF THE DRAWINGS

The foregoing and other objects and features of the present invention will become more apparent upon a consideration of the following description taken in connection with the accompanying drawings wherein:

FIG. 1 is a side view of a tree harvesting apparatus constructed in accordance with the present invention and illustrating the relationship between a felling assembly, a delimber assembly, and a bunk or carrier;

FIG. 2 is a front view, taken generally along the line 2—2 of FIG. 1, illustrating the relationship of a felling head to the delimber assembly during a delimbing operation;

FIG. 3 is a front view, generally similar to FIG. 2, illustrating the tilting of a felling boom to position the felling head to engage the trunk of a tree growing on the side of a hill;

FIG. 5 is a side view of the felling boom in a partially retracted condition and with the butt end portion of a delimbed tree trunk extending out of a bunk or carrier assembly;

FIG. 6 is a side view illustrating the use of the felling boom to shove the extending tree trunk of FIG. 5 back into the bunk; and FIG. 7 is a plan view, taken generally along the line 7—7 of FIG. 6, illustrating the relationship between the felling head and outer boom section.

DESCRIPTION OF ONE SPECIFIC PREFERRED EMBODIMENT OF THE INVENTION

Figure 4:
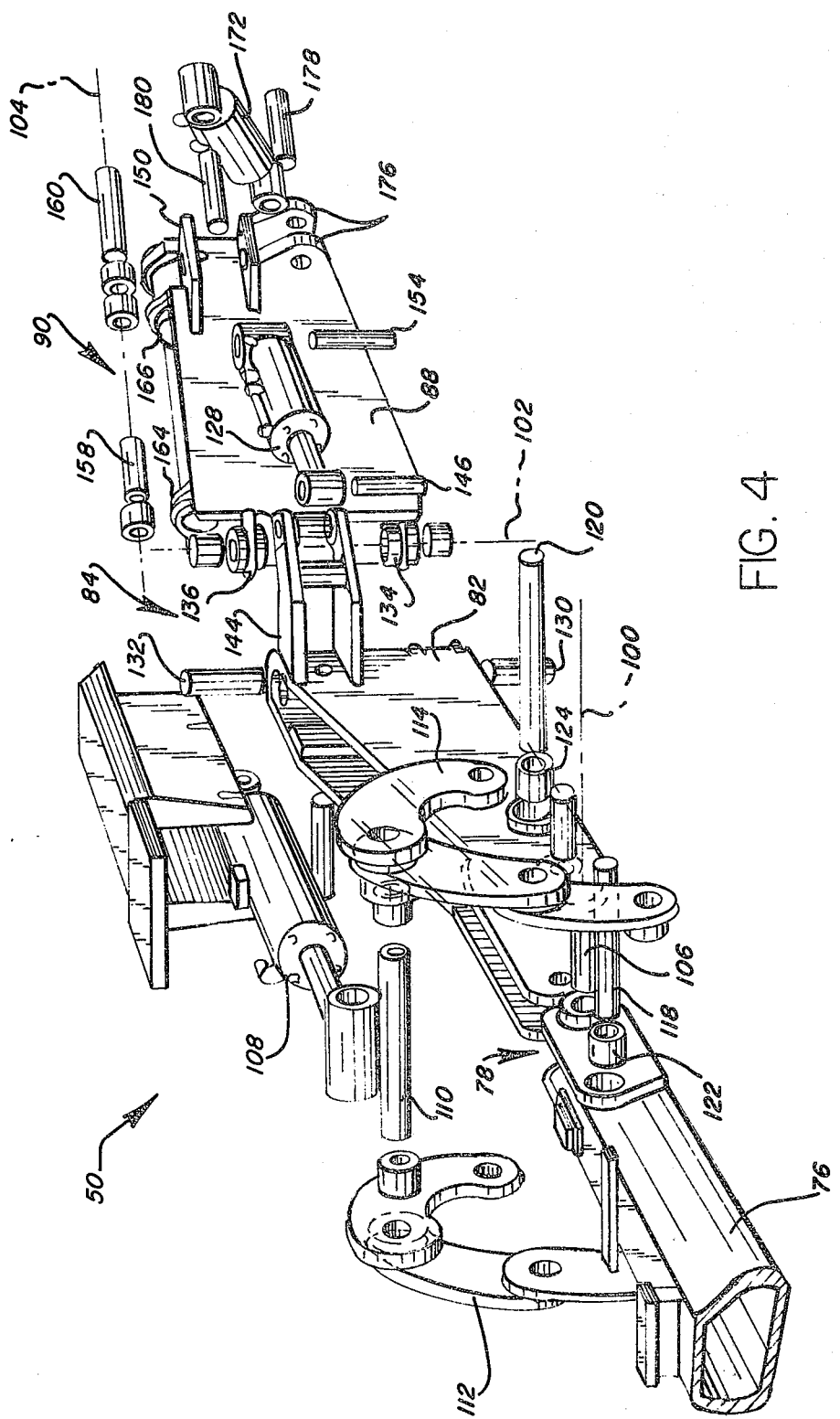
FIG. 4 is an enlarged partially exploded fragmentary view illustrating how sections of the felling boom are pivotally interconnected.

A tree harvesting apparatus 10 constructed in accordance with the present invention includes an articulated vehicle 12 having a front section 14 which is pivotally connected at 16 with a rear or trailing section 18. The vehicle 12 forms a base upon which felling assembly 22, delimber assembly 24 and carrier or bun 26 are disposed. An operator's cab 28 is mounted on the front section 14 of the vehicle 12.

The felling assembly 22 includes a felling head 32 having a pair of clamp arms 34 and 35 (FIG. 7) which are operable to grip the trunk 36 of a standing tree 38 in the manner illustrated in dashed lines in FIG. 1. The clamped tree trunk is then severed by operating felling shears 42. The felling shears 42 include a pair of relatively movable blades 44 and 46 (FIGS. 2 and 7) which are moved together by a suitably motors 47 to sever or cut the trunk 36 (FIG. 1) of the tree 38 in a known manner.

Once the tree trunk 36 is severed, an articulated felling boom assembly 50 is operated from an extended condition (illustrated in dashed lines in FIG. 1) to a retracted condition (illustrated in solid lines in FIG. 1) to position the severed tree trunk, which is securely held by the clamp arms 34, in the delimber assembly 24. A delimber carriage 54 is then moved axially outwardly along a longitudinally extending delimbing boom assembly 56 by suitable drive assembly (not shown). As the delimber carriage 54 moves axially outwardly along the boom assembly 56, delimber knives 58 are effective to strip the limbs from the trunk 36 of the tree 38. The tip end of the trunk is then cut off with topping shears 60.

The delimbed and topped tree trunk 36 is deposited in the bunk 26 which includes an upwardly sloping bottom or support plate 62 upon which the tree trunk rests. Delimbed tree trunks are held against sideward movement by a pair of side rails 64 (only one of which is shown in FIGS. 1 and 2).

To promote efficient operation of the tree harvesting apparatus 10, it is necessary for the felling head 32 to be movable to engage a standing tree in any one of a plurality of positions and orientations relative to the front section 14 of the vehicle 12. Thus, the felling head 32 is movable sideways between the positions illustrated in dashed lines at 68, 70 and 72 in FIG. 2 to engage standing trees which are offset relative to the center of the vehicle 12. In addition, the harvesting of trees growing on the side of a hill is facilitated by tilting of the felling head 32 in the manner shown in FIG. 3. Finally, the felling head 32 can be raised and lowered between the extended condition shown in dashed lines in FIG. 1 and the retracted position shown in solid lines in FIG. 1 to position the clamped trunk of a felled tree in the delimber assembly 24.

In accordance with a feature of the present invention, an outer boom section 76 of the felling boom assembly 50 is movable about any one of three axes to provide for either sideways, tilting or up and down movement of the felling head 32. To enable the felling head to be raised and lowered, the outer boom section 76 is pivotal about a connection 78 between the outer boom section 76 and an intermediate boom section 82 (FIG. 1). To enable the felling head to be moved sideways between the positions illustrated in dashed lines at 68, 70 and 72 in FIG. 2, the intermediate boom section is pivotally connected at 84 with an inner boom section 88. To enable the felling head 32 to be tilted in the manner illustrated in FIG. 3, the inner boom section 88 is pivotally connected at 90 with the frame of the vehicle 12 for movement about an axis extending perpendicular to the axle 92 of the vehicle.

Upon tilting movement of the inner boom section 88, the entire boom assembly 50 and felling head 32 are moved together relative to the vehicle 12. Thus, upon movement of the inner boom section 88 in a counterclockwise direction (as viewed in FIGS. 2 and 3) about the connection 90, the felling head 32 is tilted through an arc designated 96. Similarly, upon movement of the inner boom section 88 in a clockwise direction, as viewed in FIGS. 2 and 3, the felling head is tilted through the arc designated 98 in FIG. 2. This tilting movement enables the felling head 32 to be positioned to engage the trunk of a tree growing on the side of a hill in the manner illustrated in FIG. 3.

The outer boom section 76 is movable about any one of three mutually perpedicular axes. Thus, the outer boom section 76 is pivotal about what may be considered as a generally horizontal X axis 100 (FIG. 4) which extends through the pivot connection 78. The intermediate boom section 82 is pivotal about what may be considered as a vertical or Y axis 102 which extends through the pivot connection 84. Finally, the inner boom section 88 is pivotal about a horizontal or Z axis 104 which extends through the pivot connection 90.

Upon operation of an in-out piston and cylinder type motor 108, the outer boom section 76 is pivoted about a pin or link 106 of the pivot connection 78 to either raise or lower the outer boom section. Thus, upon operation of the motor 108 from an extended condition to a retracted condition the outer boom section 76 is swung upwardly from the position shown in dashed lines in FIG. 1 to the position shown in solid lines in FIG. 1. As this occurs, the outer boom section moves about the X axis 100 which extends through the center of the pivot pin 106. The motor 108 is connected with the outer boom section 76 by a pin 110 and linkages 112 and 114 which are pivotally connected with the outer and intermediate boom sections by pins 118 and 120 and bushings 122 and 124.

Upon operation of a piston and cylinder type slewing motor 128, the outer boom section 76 and intermediate boom section 82 are pivoted together about the Y axis 102 at the connection 84. The intermediate boom section 82 is connected with the inner boom section 88 at the connection 84 by pivot pins 130 and 132 which engage retaining sections 134 and 136 fixedly connected with the inner boom section. Upon operation of the slewing motor 128 to a fully extended condition, the intermediate section 82 is pivoted to move the felling head 32 to the position illustrated in dashed lines at 68 in FIG. 2. As the slewing motor 128 is retracted, the felling head 32 is moved toward the position shown in dashed lines at 70 in FIG. 2. Finally, when the slewing motor 128 is fully retracted, the felling head 32 is moved to the position shown in dashed lines at 72 at FIG. 2. The slewing motor 128 is pivotally connected with a mounting flange 144 on the intermediate boom section 82 by a pin 146 and is pivotally connected with a mounting flange 150 on the inner boom section 88 by pivot pin 154.

The felling head 32 is tilted in the manner illustrated in FIG. 3 by pivoting the inner boom section 88 about the Z axis 104 at the pivot connection 90. The connection 90 includes pivot pins 158 and 160 which engage mounting flanges 164 and 166 on the inner boom section 88 and mounting flanges (not shown) on the frame of the vehicle 12. Upon operation of a tilt motor 172, the entire boom assembly 50 is pivoted about the Z axis 104. Thus, when the tilt motor 172 is retracted, the boom assembly 50 is pivoted in a counterclockwise direction (as viewed in FIG. 3) to move the felling head 32 through the arc 96. Similarly, when the tilt motor 172 is extended, the boom assembly 50 is pivoted in a clockwise direction (as viewed in FIG. 3) to move the felling head 32 through the arc 98. The tilt motor 172 is pivotally connected with mounting flanges 176 on the inner boom section 88 by a pivot pin 178 and is pivotally connected with the frame of the vehicle by a pin 180.

In the illustrated embodiment of the invention the Z axis 104, about which the inner boom section 88 pivots, is disposed directly beneath the longitudinal axis of the delimber boom 56. Therefore, when the vehicle 12 is on flat horizontal surface, the longitudinal central axis of the delimber boom 56 and the Z axis 104 are disposed in coincident vertical planes. However, the axis 104 of the felling boom 22 could, if desired, be offset to one side of the longitudinal axis of the delimbing boom 56. It should be understood that although the X axis 100 and Z axis 104 are considered as being horizontal and the Y axis 102 as being vertical, these axes will be offset from the vertical and horizontal planes when the vehicle 12 is on uneven terrain. In addition, the Y axis 102 will be offset relative to a vertical plane and the Y axis 100 will be offset relative to a horizontal plane when the tilt motor 172 has been operated to pivot the inner boom section about the Z axis 104.

The felling head 32 is pivotally mounted on the outer most end portion of the outer boom section 76 for movement about an axis extending parallel to the Y axis 100. A felling head trim motor 184 (FIG. 1) is connected at its head end with the outer boom section 76 and is connected at its rod end with the felling head 32 by a suitable linkage 188. Upon operation of the trim motor 184, the felling head 32 is pivoted about a generally horizontal axis extending parallel to the axis 100 to enable the felling head 32 to engage the trunk 36 of the tree in all types of terrain.

After a tree trunk has been delimbed by operation of the delimber assembly 24, the tree trunk is deposited in the bunk 26. It is contemplated that under certain circumstances a butt end 192 (FIG. 5) of a delimbed tree trunk 36 may slip forwardly and project out of the bunk 26. To enable the delimbed tree trunk 36 to be shoved back into the bunk 26, the outer boom section 76 is provided with a ribbed surface 196 (see FIG. 7). The ribbed surface 196 is moved into engagement with the butt end 192 of the tree trunk 36 by retracting the in-out motor 108 (see FIGS. 5 and 6). Continued retraction of the motor 108 causes the outer boom section 76 to shove the tree trunk axially into the bunk 26 to thereby position the tree trunk for transportation to an unloading location. The felling head is advantageously provided with a shield plate 202 which prevents the clamp arms 34 and felling blades 44 and 46 from being damaged by engagement with the butt end of a tree trunk during the shoving of the tree trunk back into the bunk 26. In fact, the shield plate 202 can, if desired, be utilized to press against the butt end 192 of the tree trunk to initiate movement of the tree trunk back into the bunk.

In view of the foregoing description, it can be seen that the tree harvesting apparatus 10 includes a felling assembly 22 having an articulated boom 50. This articulated boom includes an inner section 88 which is pivotally connected with the frame of a vehicle 12 for movement about a Z axis 104 which, when the vehicle 12 is on flat horizontal terrain, is a horizontal axis. Tilting movement of the inner boom section 88 by the tilt motor 172 causes the felling head 32 to be tilted to engage the trunk of a tree growing on a side of a hill in the manner illustrated in FIG. 3.

An intermediate section 82 of the boom assembly 50 is pivotal about a Y axis 102 which at all times extends perpendicular to the Z axis 104. Thus, upon operation of a slewing motor 128 the intermediate section 82 and outer section 76 of the boom assembly 50 are pivoted about the Y axis 102 to move the felling head 32 between the positions designated 68, 70 and 72 in FIG. 2.

The outer boom section 76 is also pivotal about the X axis 100 which is perpendicular to the Y axis 102. Upon operation of the in-out motor 108, the outer boom section 75 is moved to either raise or lower the felling head 32. The felling head 32 can be pivoted relative to the outer boom section 76 by operation of a trim motor 184.

The articulated felling boom assembly 22 is relatively inexpensive to fabricate and is readily mounted on a vehicle 22. Due to the three degrees of freedom of movement of the outer boom section 76 about the axes 100, 102 and 104, the felling head 32 can be readily positioned by an operator relative to the trunk of a tree. It should be noted that the felling head 32 can be simultaneously moved relative to all three axes 100, 102 and 104 by effecting simultaneous operation of the tilt motor 172, slewing motor 128 and in-out motor 108.

Having described one specific preferred embodiment of the invention, the following is claimed:

1. An apparatus for use in harvesting trees, said apparatus comprising a base, delimbing means connected with said base for delimbing a felled tree, said delimbing means extending longitudinally with respect to said base, felling head means for clamping and severing the trunk of a standing tree, articulated boom means connected with said felling head means for moving said felling head means relative to said delimbing means, means for supporting said articulated boom means for pivotal movement relative to said base about a first axis longitudinally oriented with respect to said base, and first motor means for pivoting said articulated boom means about said first axis.

2. An apparatus as set forth in claim 1 wherein said articulated boom means is operable between an extended condition and a retracted condition in which said felling head means is disposed adjacent to one end portion of said delimbing means, said first motor means being operable when said articulated boom is in the retracted condition to move said felling head means in a flat plane extending perpendicular to the longitudinal axis of said delimbing means.

3. An apparatus for use in harvesting trees, comprising a base; delimbing means connected with said base for delimbing a felled tree, said delimbing means extending longitudinally with respect to said base; felling head means for clamping and severing the trunk of a standing tree; articulated boom means connected with said felling head means for moving said felling head means relative to said delimbing means; means for supporting said articulated boom means for pivotal movement relative to said base about a first axis longitudinally oriented with respect to said base; first motor means for pivoting said articulated boom means about said first axis; and longitudinally extending bunk means connected with said base for receiving delimbed tree trunks, said articulated boom means including surface means for engaging a butt end of a delimbed tree trunk disposed in said bunk means; and second motor means for moving said surface means and the butt end of a delimbed tree trunk disposed in said bunk means to position the butt end of the delimbed tree trunk axially relative to said bunk means.

4. An apparatus for use in harvesting trees, comprising a base; delimbing means connected with said base for delimbing a felled tree, said delimbing means extending longitudinally with respect to said base; felling head means for clamping and severing the trunk of a standing tree; articulated boom means connected with said felling head means for moving said felling head means relative to said delimbing means; and means for supporting said articulated boom means for pivotal movement relative to said base about a first axis longitudinally oriented with respect to said base, said articulated boom means including an inner boom section pivotally connected with said base by said means for supporting said boom means for pivotal movement relative to said base about said first axis, an intermediate boom section, means for pivotally connecting said intermediate boom section with said inner boom section about a second axis extending perpendicular to said first axis, an outer boom section, means for pivotally connecting said outer boom section with said intermediate boom section and for enabling said outer boom section to pivot relative to said intermediate boom section about a third axis extending perpendicular to said first and second axes; and first motor means for pivoting said articulated boom means about said first axis.

5. An apparatus as set forth in claim 4 further including means for pivotally connecting said felling head means with an outer end portion of said outer boom section and for enabling said felling head means to pivot relative to said outer boom section about a fourth axis extending parallel to said third axis.

6. An apparatus as set forth in claim 4 further including means for connecting said first motor means with said base and said inner boom section to enable said first motor means to pivot said inner boom section relative to said base about said first axis, second motor means connected with said inner and intermediate boom sections for pivoting said intermediate boom section relative to said inner boom section about said second axis, and third motor means connected to said intermediate and outer boom sections for providing said outer boom section relative to said intermedite boom section about said third axis.

7. An apparatus as set forth in claim 6 further including means for pivotally connecting said felling head means with an outer end portion of said outer boom section and for enabling said felling head means to pivot relative to said outer boom section about a fourth axis, and fourth motor means connected with said outer boom section and said felling head means for pivoting said felling head means relative to said outer boom section about said fourth axis.

8. An apparatus for use in harvesting trees, said apparatus comprising a base, a boom assembly connected with and extending outwardly from said base, said boom assembly including a longitudinally extending outer boom section, felling head means connected with said outer boom section for severing the trunk of a standing tree, and means for enabling said outer boom section to move relative to said base about any one of three mutually perpendicular axes to facilitate positioning of said felling head means relative to a standing tree.

9. An apparatus for harvesting trees, comprising a base; a boom assembly connected with and extending outwardly from said base, said boom assembly including a longitudinally extending outer boom section; felling head means connected with said outer boom section for severing the trunk of a standing tree; means for pivoting said outer boom section about a first axis for raising and lowering said felling head means by moving said felling head means along a first arcuate path extending perpendicular to said first axis; means for pivoting said outer boom section about a second axis extending perpendicular to said first axis to move said felling head means along a second arcuate path extending perpendicular to said first arcuate path; and means for pivoting said outer boom section about a third axis extending perpendicular to said first and second axes to move said felling head means along a third arcuate path extending perpendicular to said first and second arcuate paths.

10. An apparatus as set forth in claim 9 wherein said boom assembly further includes an intermediate boom section pivotally connected with said outer boom section and an inner boom section pivotally connected with said intermediate boom section and said base, said apparatus further including motor means for simultaneously moving said outer, intermediate and inner boom sections relative to said base about one of said axes.

11. An apparatus as set forth in claim 8 further including means for pivotally connecting said felling head means with said outer boom section and for enabling said felling head means to move about a fourth axis relative to said outer boom section.

12. An apparatus for use in harvesting trees, comprising a base; a boom assembly connected with and extending outwardly from said base, said boom assembly including a longitudinally extending outer boom section, an intermediate boom section pivotally connected with said outer boom section, and an inner boom section pivotally connected with said intermediate boom section and said base; felling head means connected with said outer boom section for severing the trunk of a standing tree; first piston and cylinder means connected with said base and said inner boom section for simultaneously pivoting said outer, intermediate and inner boom sections relative to said base about a first axis; second piston and cylinder means connected with said intermediate and inner sections for simultaneously pivoting said outer and intermediate boom sections relative to said base about a second axis which extends transversely to said first axis; and third piston and cylinder means connected with said outer and intermediate boom sections for pivoting said outer boom section relative to said base about a third axis which extends transversely to said first and second axes.

13. An apparatus as set forth in claim 12 further including means for pivotally connecting said felling head means with an outer end portion of said outer boom section and for enabling said felling head means to pivot about a fourth axis, and fourth piston and cylinder means connected with said outer boom section and said felling means for pivoting said felling head means relative to said outer boom section about the fourth axis.

14. An apparatus for use in harvesting trees, said apparatus comprising a base, a boom assembly connected with and extending outwardly from said base, said boom assembly including a longitudinally extending outer boom section; felling head means connected with said outer boom section for severing the trunk of a standing tree; means for enabling said outer boom section to move relative to said base about any one of three axes to facilitate positioning of said felling head means relative to a standing tree; and surface means disposed on said outer boom section for engaging the butt end of a severed tree trunk and moving the severed tree trunk axially.

15. An apparatus for use in harvesting trees, said apparatus comprising a base, delimbing means connected with said base for delimbing a felled tree, longitudinally extending bunk means connected with said base for holding delimbed tree trunks, felling head means for clamping and severing the trunk of a standing tree, articulated boom means connected with said felling head means to position a severed tree trunk in said delimbing means and for moving said articulated boom means to shove an outwardly projecting delimbed tree trunk axially into said bunk means, said articulated boom means including surface means engaging the butt end of a delimbed tree trunk extending from said bunk means.

* * * * *